United States Patent
Matsuoka

[19]

[11] Patent Number: 5,944,828
[45] Date of Patent: Aug. 31, 1999

[54] POWER SUPPLY CONTROLLER IN COMPUTER SYSTEM FOR SUPPLYING BACKUP POWER TO VOLATILE MEMORY WHILE THE COMPUTER RECEIVES AC POWER

[75] Inventor: Yoshio Matsuoka, Tokyo, Japan

[73] Assignee: Kabushiki Kaisha Toshiba, Kawasaki, Japan

[21] Appl. No.: 08/932,542

[22] Filed: Sep. 17, 1997

[30] Foreign Application Priority Data

Sep. 19, 1996 [JP] Japan .................................. 8-247798

[51] Int. Cl.$^6$ ...................................... G06F 1/26
[52] U.S. Cl. .......................... 713/323; 713/324; 713/320; 307/66
[58] Field of Search .......................... 395/750.01–750.08, 395/182.12–183.01; 713/300, 310, 320, 321, 322, 323, 324, 330, 340; 307/66

[56] References Cited

U.S. PATENT DOCUMENTS

| | | | |
|---|---|---|---|
| 5,435,005 | 7/1995 | Saito | 395/183.18 |
| 5,485,623 | 1/1996 | Kurokawa et al. | 395/182.2 |
| 5,532,935 | 7/1996 | Ninomiya et al. | 364/528.31 |
| 5,551,008 | 8/1996 | Saito | 711/161 |
| 5,553,294 | 9/1996 | Nanno et al. | 395/750.08 |
| 5,598,565 | 1/1997 | Reinhardt | 395/750.05 |
| 5,657,257 | 8/1997 | Lee | 364/707 |

*Primary Examiner*—Thomas C. Lee
*Assistant Examiner*—Harold J. Kim
*Attorney, Agent, or Firm*—Finnegan, Henderson, Farabow, Garrett & Dunner, L.L.P.

[57] ABSTRACT

In a computer system equipped with a hibernation type resume function including standby control functions, a power supply controller detects whether AC power or battery power is used as power for the system. When AC power is supplied, power is kept supplied to a memory even when a power switch is set off. When the power switch is set on later, an AC standby control function to set the system back to the operational state is executed based on the memory contents.

20 Claims, 10 Drawing Sheets

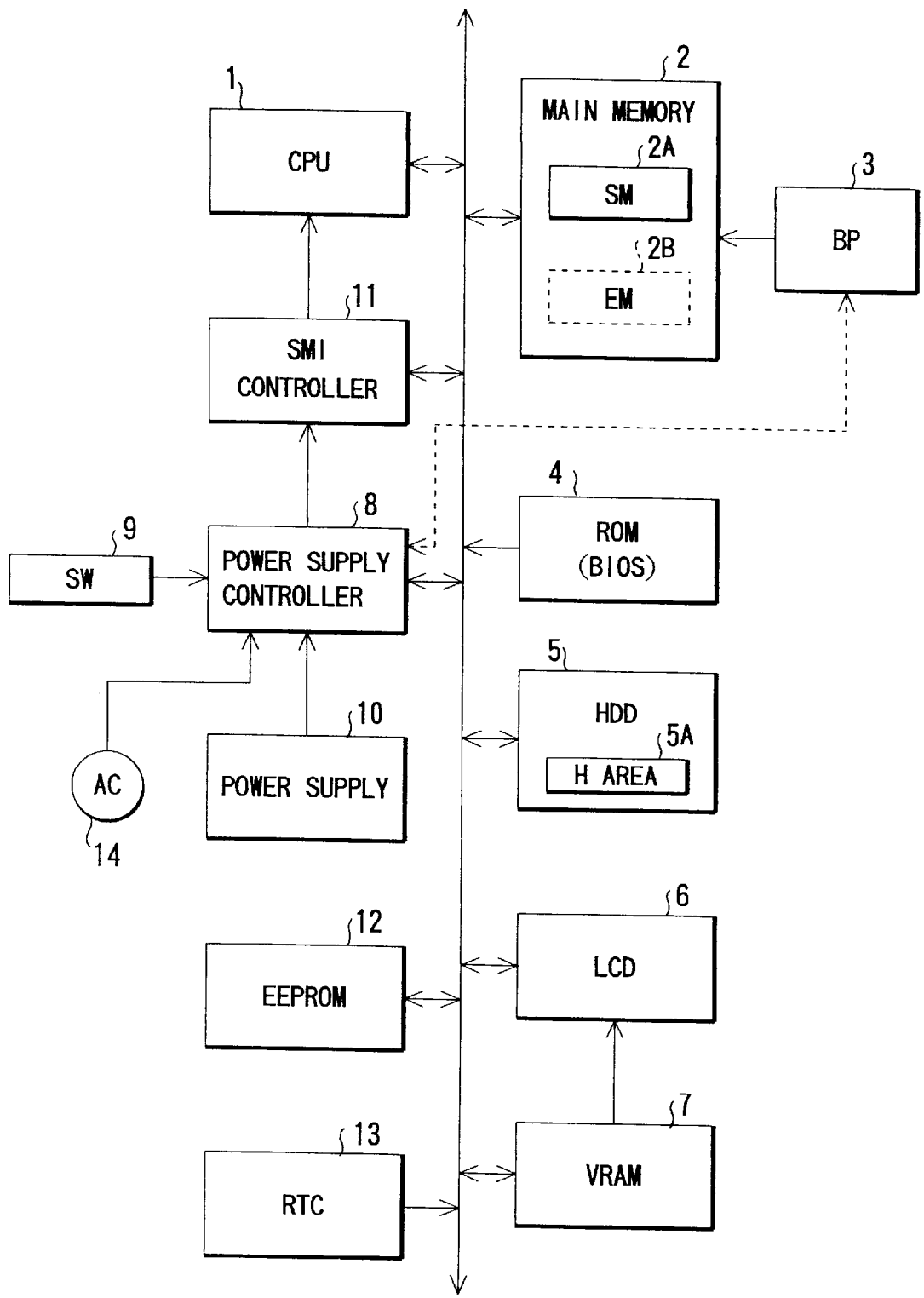
F I G. 1

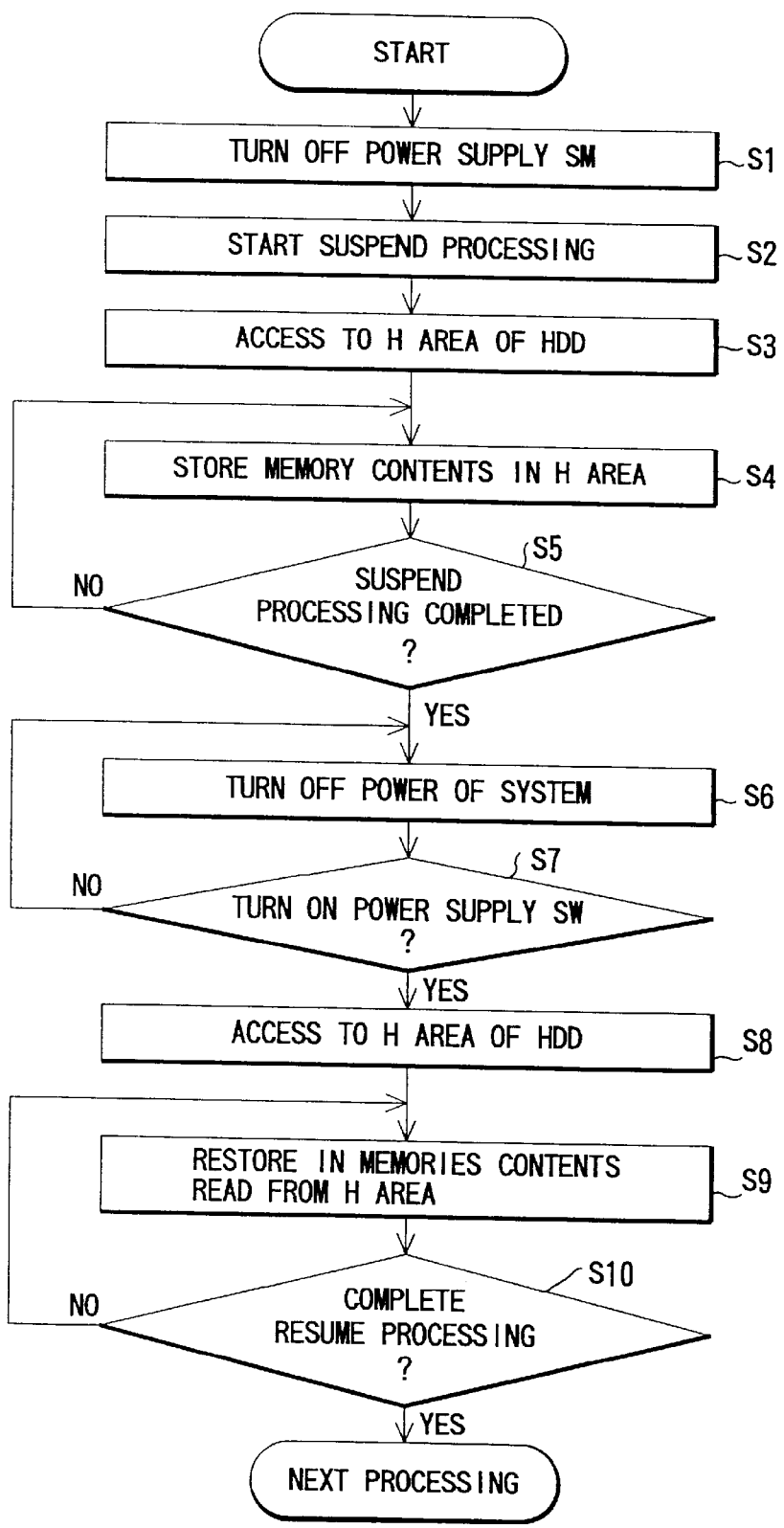
F I G. 5

POWER SUPPLY CONTROLLER IN COMPUTER SYSTEM FOR SUPPLYING BACKUP POWER TO VOLATILE MEMORY WHILE THE COMPUTER RECEIVES AC POWER

BACKGROUND OF THE INVENTION

The present invention relates to a computer system, and, more particularly, to a computer system like a personal computer, which has a resume function called a hibernation system.

The entire contents of Japanese Patent Application No. 8-247798 filed on Sep. 19, 1996 are incorporated herein by reference.

Conventional portable personal computers, particularly, those operable by battery power, are equipped with a resume function which saves information about the display status and the operational status of the system and/or the operational status of an application program in a backed-up memory before actually being powered off when a power switch is set off, and restores the saved information, upon power on, to resume the system from the status before the power-off time. According to the resume function (or suspend/resume function), information stored in the main memory, and status information or the like set in the internal register of a CPU (Central Processing Unit) are saved, and when the computer is powered on next, those information are restored.

A rechargeable battery and an auxiliary battery are used as a backup power supply needed for the resume function. When a user forgets to exchange such an auxiliary battery with one having sufficient power or the remaining battery capacity (currently usable power capacity) is insufficient, however, the execution of the resume function may result in erasure of information (memory contents) to be saved in the memory. To cope with this shortcoming, a hibernation type resume function has been developed which saves the memory contents on a hard disk drive (HDD) installed in the system at the time the resume function is executed, so that it can protect the memory contents even when power supply to the system is completely stopped.

Since compact and large-capacity HDDs are recently installed in portable personal computers or so-called notebook type computers, the hibernation type resume function which saves information about the operational status of the system and/or the operational status of an application program on such an HDD is effective. HDDs are one kind of non-volatile memory means capable of saving data without requiring backup power and can ensure the resume function almost permanently.

Because the hibernation type resume function can save the memory contents, which have been saved at the power-off time, on an HDD, one kind of non-volatile memory means, that requires no backup power, it is possible to prevent the memory contents from being unintentionally erased and to reliably resume the system from the state before the power-off time when the system is powered on again.

The hibernation type resume function however has the following shortcoming. As HDDs suffer slower access speeds than IC memories or the like, they require a certain time in the disk access operation for writing the memory contents on a disk or reading the memory contents therefrom. When the memory contents are saved on an HDD by the resume function (suspend process) as the power switch is set off and the power switch is set on immediately to resume the operation, particularly, it takes a considerable amount of time to restore the saved memory contents into the original memory from the HDD. When this hibernation type resume function is adapted to a portable personal computer like a notebook type, therefore, the user's operability is degraded.

As a solution to this problem, a so-called standby control function (a standby mode) has been developed which keeps supplying backup power to the memory only for a predetermined period of time even when the power switch is set off so that when the power switch is set on again within the predetermined time, the memory contents can be restored quickly from the memory to set the system in the operational condition. In other words, when a predetermined time passes, the standby control function is released to power off the system immediately. When used in a notebook type personal computer which operates on battery power, therefore, this system is effective because it can reduce the consumed power of the battery. Unlike battery-driven type, however, personal computers which can use AC adapters to utilize commercially available AC power (hereinafter called AC power) as system power do not require a reduction in consumed power so much. For such personal computers, it is more important to improve the users' operability.

BRIEF SUMMARY OF THE INVENTION

It is an object of the present invention to accomplish a standby control function which restores memory contents quickly upon power on in a resume mode when an AC power supply is used, thereby improving the users' operability.

It is another object of this invention to provide a computer system having a resume function which can be adapted widely by preparing proper standby control functions for different types of power supplies when AC power and battery power are used as the system power.

According to an aspect of the present invention, there is provided an apparatus for powering volatile memory in a system having battery power supply input means, AC power supply input means, switch means for indicating powering up and powering down, volatile memory, and data transfer means for selectively transferring backup data to and from the volatile memory, comprising: power mode setting means for setting one of plural possible standby power modes of the system; power source determining means connected to the AC power supply input means for determining whether AC power is available; and power control means responsive to the battery power supply input means, the AC power supply input means, the switch means, the power source determining means, and the power mode setting means for selectively powering the volatile memory according to the one of plural possible standby power modes of the system.

According to a second aspect of the present invention, there is provided a method for powering volatile memory in a system having battery power supply input means, AC power supply input means, switch means for indicating powering up and powering down, volatile memory, and data transfer means for selectively transferring backup data to and from the volatile memory, including the steps of: setting one of plural possible standby power modes of the system; determining whether AC power is available; and selectively powering the volatile memory according to the setting of one of plural possible standby power modes of the system and the step of determining whether AC power is available.

According to the present invention, when the power switch is set off, the memory contents are saved in a non-volatile memory section like an HDD and power is kept supplied to the memory, the system can be restored to the operational state quickly as the power switch is later set on.

Further, the computer system of this invention includes a time standby control function for keeping power supply to the memory for a set time by means of a battery power supply and a permanent standby control function for keeping power supply to the memory regardless of the type of the power supply in use, in addition to the aforementioned standby control function and AC standby control function. As a user selectively sets one of the standby control functions on the setup screen prepared by the system BIOS (Basic Input/Output System), for example, the system executes the standby control function requested by the user. When there is no AC power supplied even if the AC standby control function has been selected, the system automatically sets the time standby control function.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIG. 1 is a block diagram showing a computer according to an embodiment of the present invention;

FIG. 5 is a flowchart for explaining how the suspend processing and resume processing are performed in the computer shown in FIG. 1;

DETAILED DESCRIPTION OF THE INVENTION

Figure 2:
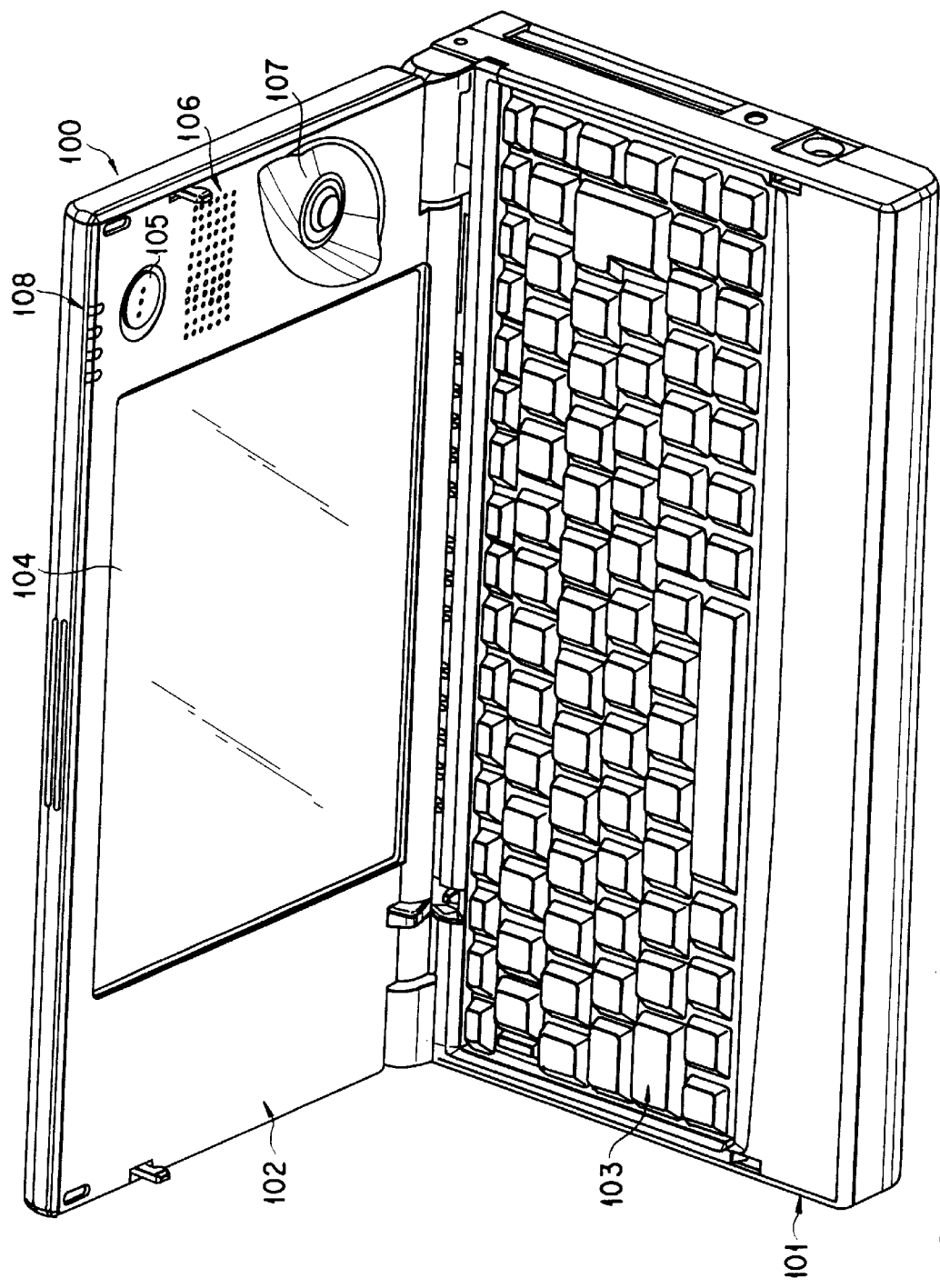
FIG. 2 is a perspective view of the computer shown in FIG. 1, showing the display unit set in the opened position.

A preferred embodiment of the present invention will now be described with reference to the accompanying drawings.

The computer system according to this embodiment is a portable personal computer like a notebook type. It is assumed that this computer uses a chargeable battery as a power supply 10 and a hard disk drive (HDD) 5 installed as an external memory device.

This system comprises a CPU (Central Processing Unit) 1, a main memory (DRAM) 2, a ROM (Read Only Memory) 4 having stored the BIOS (Basic Input/Output System), a display unit 6 comprised of a liquid crystal display (LCD), a VRAM (Video RAM) 7 for storing display data, a power supply controller (power microcomputer) 8, an SMI (System Management Interrupt) controller 11, and a non-volatile memory (EEPROM) 12. It is assumed that the main memory 2 has an SM area (SM-RAM) 2A as a work memory area the BIOS 4 uses, and an extended memory area 2B when an extended memory is installed.

The BIOS 4 is the basic software which executes the hibernation type resume function according to this invention, and performs an initialization process (boot mode) when the system is activated. As will be discussed later, the BIOS 4 includes an AC standby control function, a time standby control function and a permanent standby control function as standby control functions which are included in the resume function.

The power supply controller 8 is capable of monitoring the ON/OFF operation of a power switch 9, controlling the ON/OFF operation of a battery 10, and detecting the supply of power from an AC power supply 14 based on the connection status of an AC adapter. A backup power supply circuit (BP) 3 supplies backup power to the main memory 2 under the control of the power supply controller 8.

The SMI controller 11 is an interrupt controller which, as will be discussed later, makes an SM interrupt (SMI) to the CPU 1 in accordance with the input from the power supply controller 8 (the ON action of the power switch 9) in, for example, a standby mode. The non-volatile memory (EEPROM) 12 is a memory installed inside the system and is used to save address information for designating the resume area (H area) 5A.

The causes for power ON/OFF include an event oriented from a power ON/OFF function associated with the opening/closing operation of the display panel of the display unit 6 and an event oriented from an automatic system power off function besides the ON/OFF operation of the power switch 9. For the sake of convenience, the following description of this invention will be given of the limited case where power ON/OFF is originated from the ON/OFF operation of the power switch 9.

Figure 3:
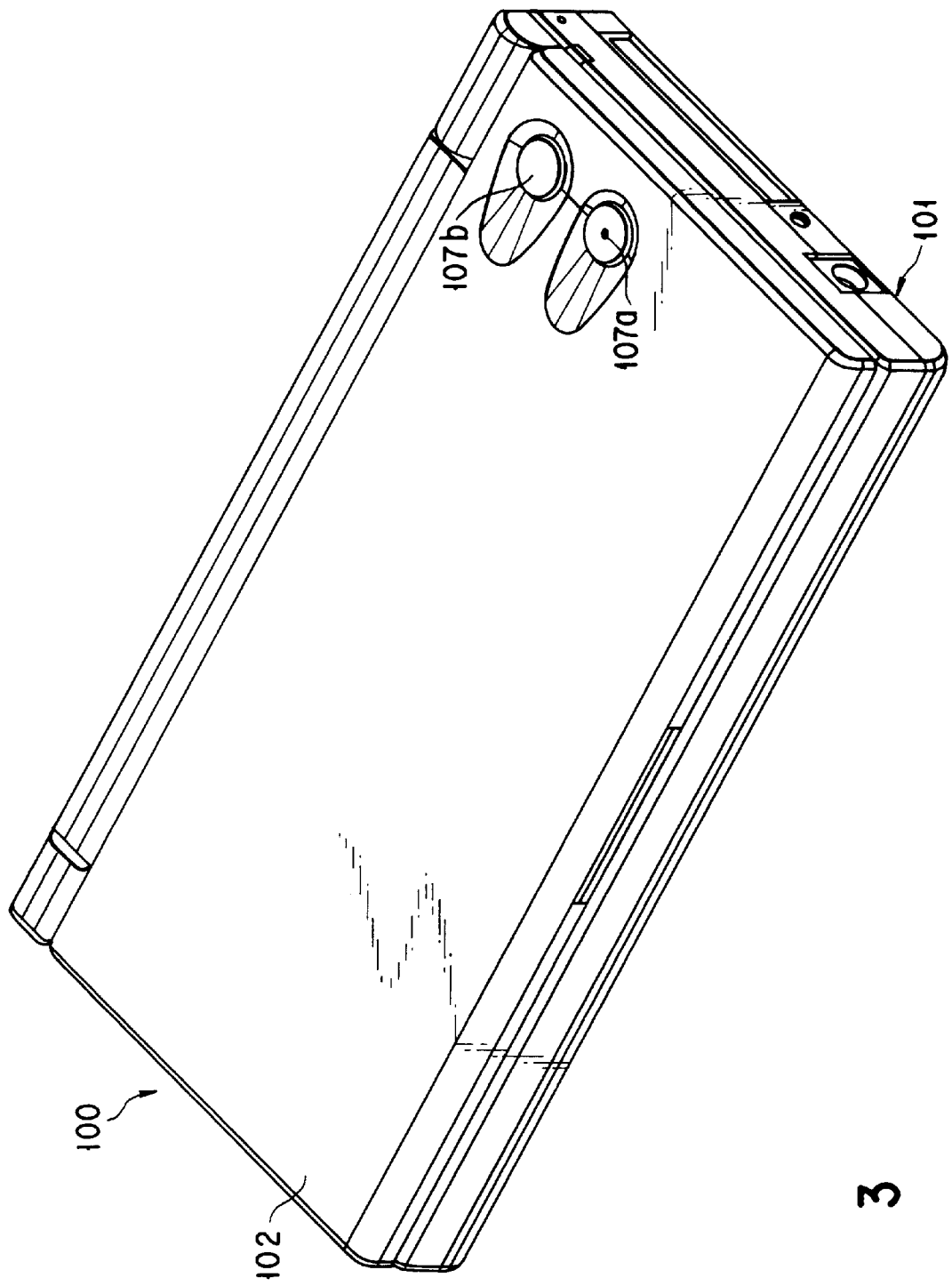
FIG. 3 is a perspective view of the computer, showing the display unit set in the closed position.

FIGS. 2 and 3 are perspective views of the computer 100 having the structure shown in FIG. 1.

The computer 100 is small enough to be placed in a suit pocket. As shown in FIGS. 2 and 3, the computer 100 comprises a flat box-shaped housing 101 and a display unit 102 secured to the housing 101.

The display unit 102 is rotatably coupled by a hinge mechanism to the housing 101. The display unit 102 incorporates a display. To use the computer 100, a user rotates the display unit 102 until the unit 102 stands almost vertically as shown in FIG. 2, thus opening the keyboard 103 provided in the top of the housing 101. As long as the unit 102 remains in the vertical position, the user can operate the keyboard 103 while seeing the information displayed on the display panel 104 of the unit 102. After using the computer 100, the user may rotate the display unit 103, moving the display panel 104 onto the keyboard 103 as shown in FIG. 3. The computer 100 is therefore quite compact and portable.

On the inner surface of the display unit 102, which opposes the keyboard 103 while the panel 104 remains on the keyboard 103, there are provided a power-supply switch 105, a speaker 106, a pointing device 107 and LEDs (Light-Emitting Diodes) 108, as well as the display panel 104. Provided on the outer surface of the display unit 102, which faces away from the inner surface, are two click buttons 107a and 107b. When depressed, the click buttons 107a and 107b operate the pointing device 107.

The resume processing of the present invention will be described.

Figure 4A:
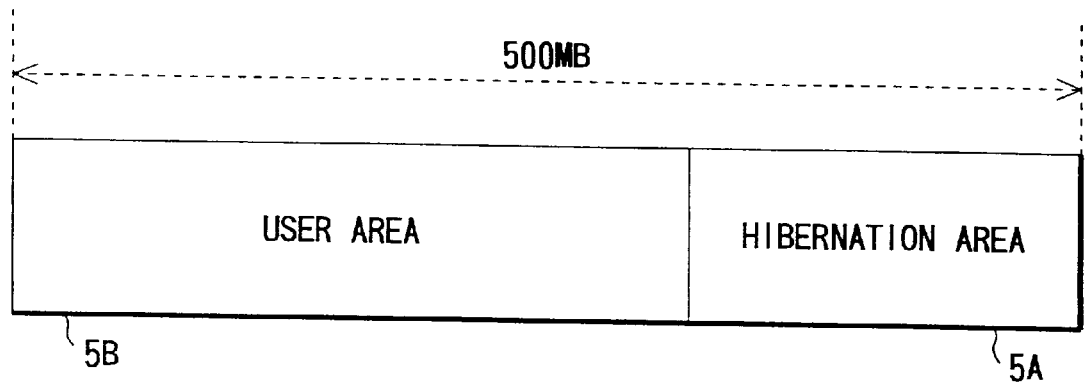
FIGS. 4A and 4B are diagrams explaining the memory area used to performing suspend processing of hibernation type.

In executing the hibernation type resume function according to this embodiment, the resume area (H area) 5A is previously secured on the disk of the HDD 5 as shown in FIG. 4A. Specifically, for the total memory capacity of the HDD 5 of 500 MB (MegaBytes), a consecutive area of, for example, 22 MB is secured as the H area 5A.

Figure 4B:
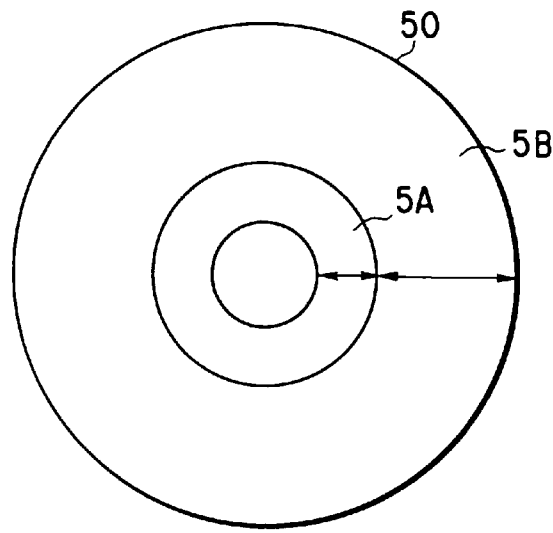

The hibernation type resume function saves all the memory contents of the main memory 2 and the VRAM 7, which are necessary for the system operation, in the H area 5A of the HDD 5. It is assumed that the capacity of the main memory 2 is 20 MB (the standard area of 8 MB plus the extended area of 12 MB), the capacity of the VRAM 7 is 1 MB and another 1 MB should be secured as a spare area for the case where a defect occurs. As shown in FIG. 4B, the H area 5A is a consecutive area of several scores of tracks in the inner peripheral area on the disk 50.

A memory area for user data (the area usable by a user) 5B on the disk 50 is managed in, for example, an FAT file format by the OS of the system, whereas the H area 5A is controlled by the BIOS 4 and cannot be used by the OS. Even when the OS of the system is changed, therefore, if the resume conditions are met, the BIOS 4 performs a process of accessing the H area 5A of the HDD 5 to save and read the entire memory contents for restoration.

The basic operation of the hibernation type resume function according to this embodiment will be discussed below with reference to the flowchart in FIG. 5.

It is premised that the power switch 9 is set on and the power supply controller 8 supplies the necessary power for the system operation from the battery 10, and the system is in an operation state (i.e., various kinds of data processes and/or controls are executed by the CPU 1). When a user sets the power switch 9 off (power-off setting process) then, for example, the BIOS 4 proceeds to a suspend process in response to an SMI. received from the power supply controller 8 (steps S1 and S2).

Specifically, the BIOS 4 saves the contents of the internal register of the CPU 1 and the contents of other hardware registers in the SM-RAM 2A of the backed-up main memory 2. Further, the BIOS 4 executes a process of accessing the H area 5A of the HDD 5 to save the entire memory contents (the memory contents of the main memory 2 and the VRAM 7) in the H area 5A (steps S3 and S4).

When the saving of the entire memory contents is completed, the power supply controller 8 cuts off power supply to the battery 10 in accordance with an instruction from the BIOS 4 (steps S5 and S6). That is, the system enters a non-operational state and the operations of the display unit 6 and the HDD 5 are stopped. At this time, the entire memory contents necessary for the display unit 6 and the HDD 5 to return to the state before the power-off of the system are saved in the H area 5A of the HDD 5.

When the user sets the power switch 9 on next, the BIOS proceeds to a resume process in response to an SMI sent from the power supply controller 8. That is, the BIOS 4 accesses the H area 5A of the HDD 5 to read the entire memory contents from the H area 5A, and stores the memory contents in the associated memories again (steps S8 to S10). Consequently, the system returns to the operational state before the occurrence of the power-off event and resumes the operation. In other words, the display data, stored in, for example, the VRAM 7 before the power-off event, is displayed on the display screen of the display unit 6, and the CPU 1 executes data processing based on the status information or the like stored in the internal register of the CPU 1.

This embodiment is designed to include the AC standby mode, the time standby mode and the permanent standby mode as standby control functions, which can selectively set by the user as needed.

The present embodiment can operate in the modes, thereby to reform the standby control function. Any standby mode can selected and set by activating power-saving utility on the operating system (OS) applied to the computer system or by selecting the corresponding one of the icons displayed in the set-up menu screen on the basis of BIOS. How a standby mode is set by activating the power-saving utility will be described below.

The power-saving utility is designed to save power in the computer system. It can control the time of turning off the power supply to the display and the hard disk drive, the luminance of the display, the operating speed of the CPU, the power supplies of the various ports, and the like. The utility can be started when the corresponding icon on the OS task bar is selected or when the corresponding key on the control panel is depressed.

Figure 6A:
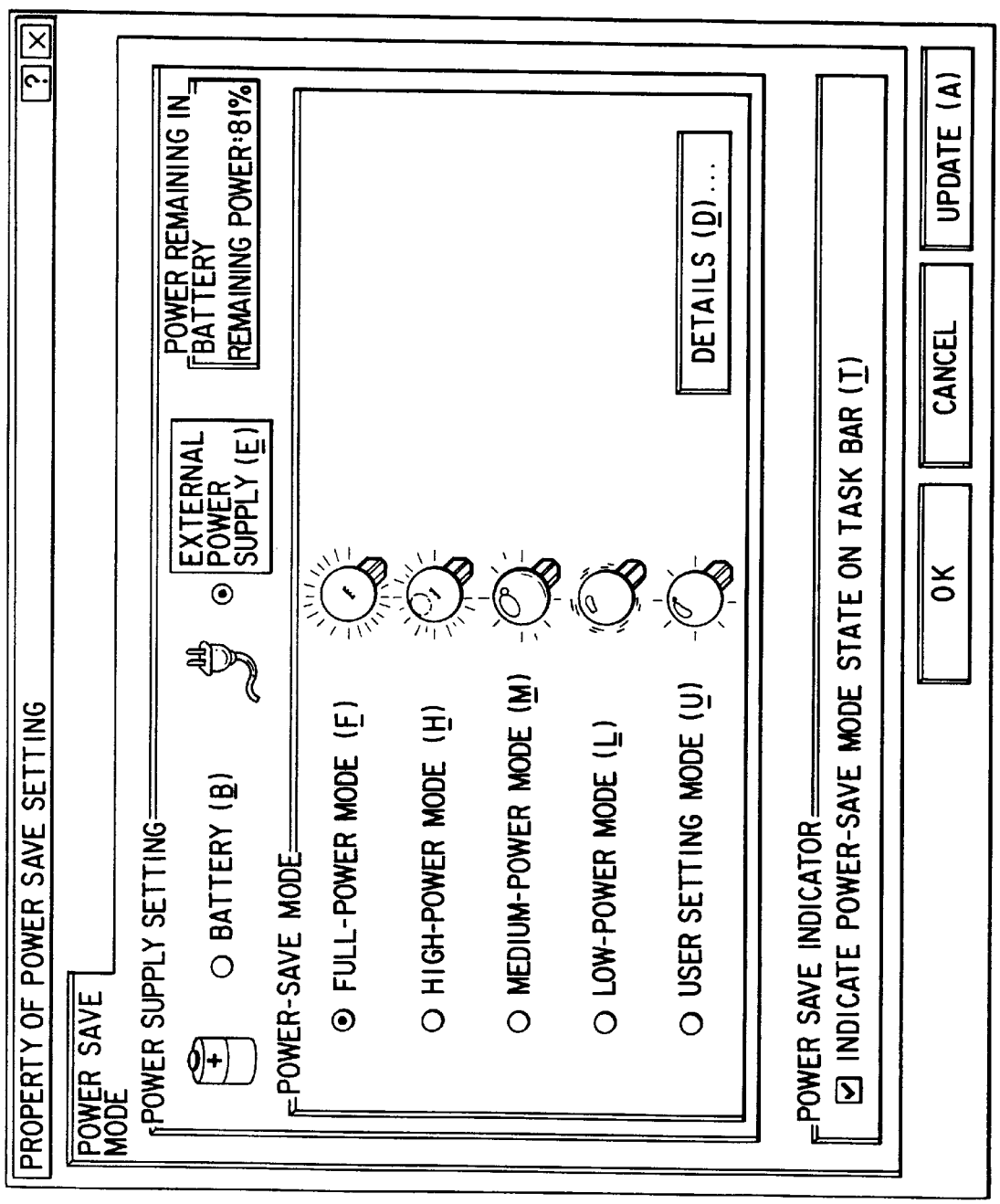
FIGS. 6A and 6B are diagram illustrating menus which can be displayed in the display screen, for enabling the user to select one of power-save modes.
Figure 6B:
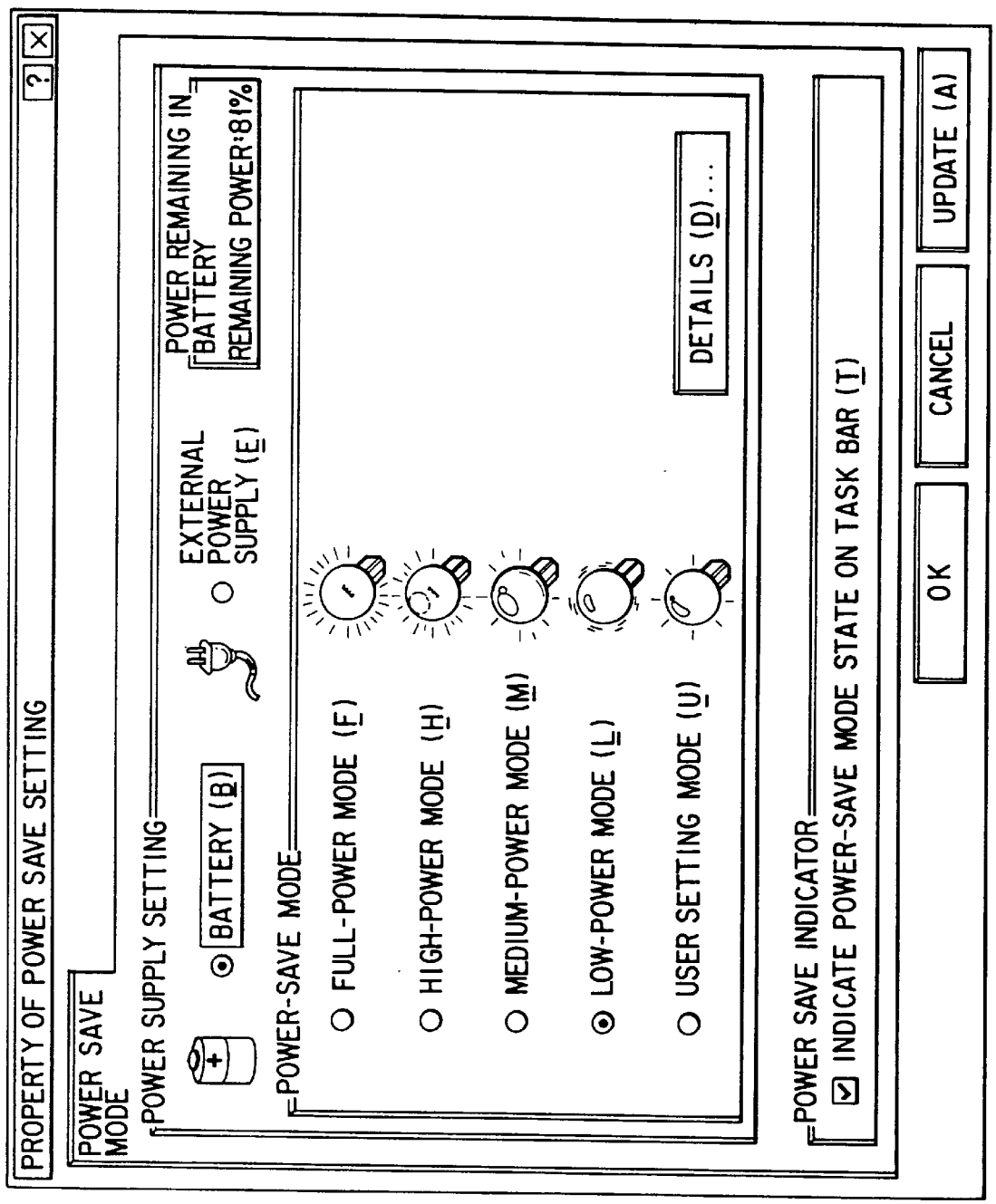

When the power-saving utility is activated, the display displays a menus in its screen. FIGS. 6A and 6B show the menu each. As seen from FIGS. 6A and 6B, the following five power save modes are available for both the battery and the external power supply (AC adapter):

1. Full Power Mode

In this mode, no power-saving control is performed. The mode is selected when the AC adapter is used while the computer system remains in the initial condition.

2. High Power Mode

Once this mode is selected, power-saving control is performed to operate the computer system at its highest efficiency at the expense of the power-saving efficiency.

3. Medium Power Mode

Once this mode is selected, power-saving control is effected to save power as much as possible and also to cause the computer system to operate at its highest efficiency. The mode is selected when the battery is used while the computer system remains in the initial condition.

4. Low Power Mode

In this mode, power-saving control is performed to save power as much as possible, at the expense of the operating efficiency of the computer system.

5. User Setting Mode

This mode is set to enable the user to save power in any other way than is defined by the full power mode, high power mode, medium power mode or low power mode.

FIG. 6A shows a menu indicating that the full power mode is selected when the external power supply (AC adapter) is used. FIG. 6B shows a menu indicating that the low power mode is selected when the battery is used.

Figure 7A:
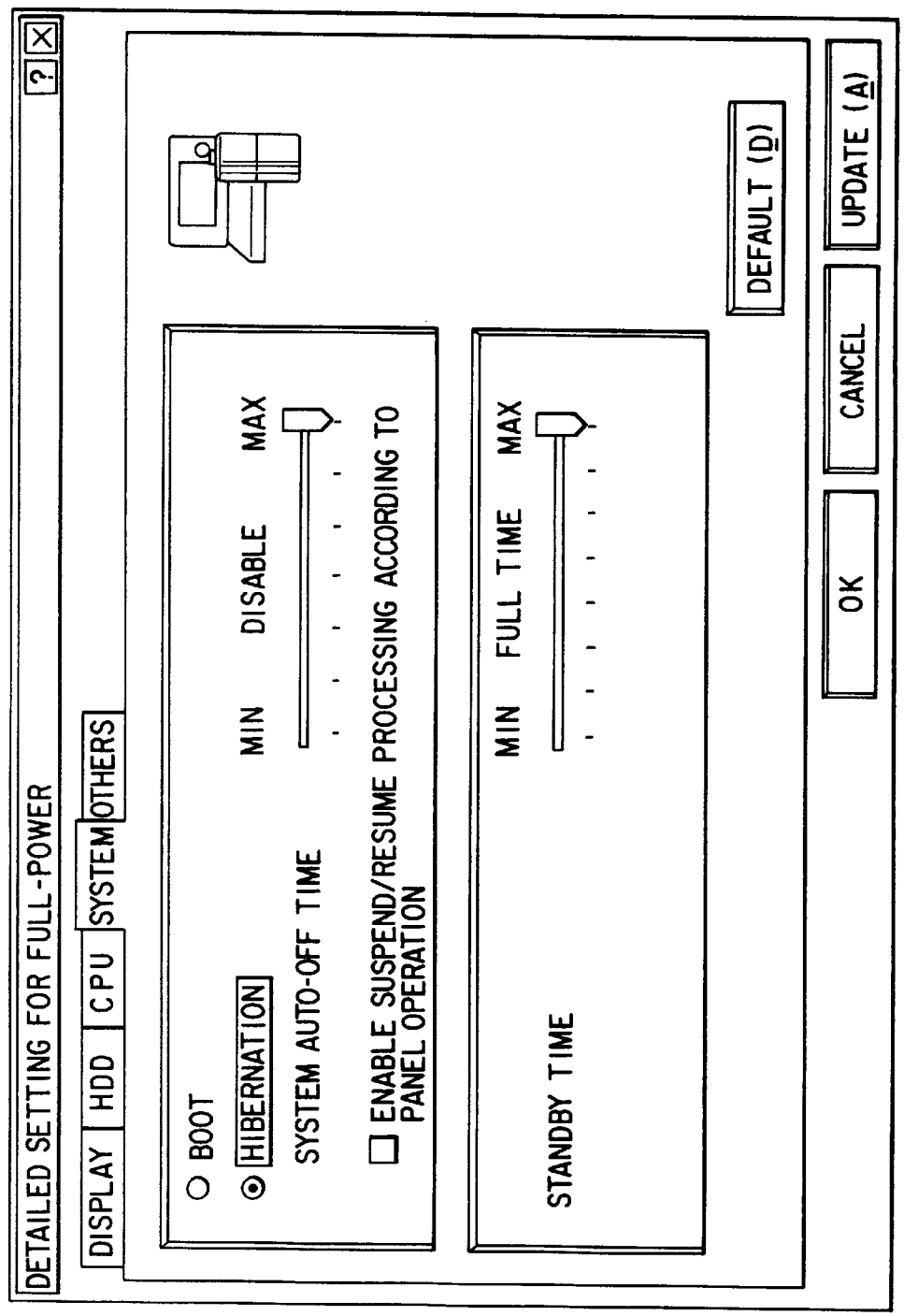
FIGS. 7A and 7B are diagrams showing menus which can be displayed in the display screen, for enabling the user to set details of selected power mode.
Figure 7B:
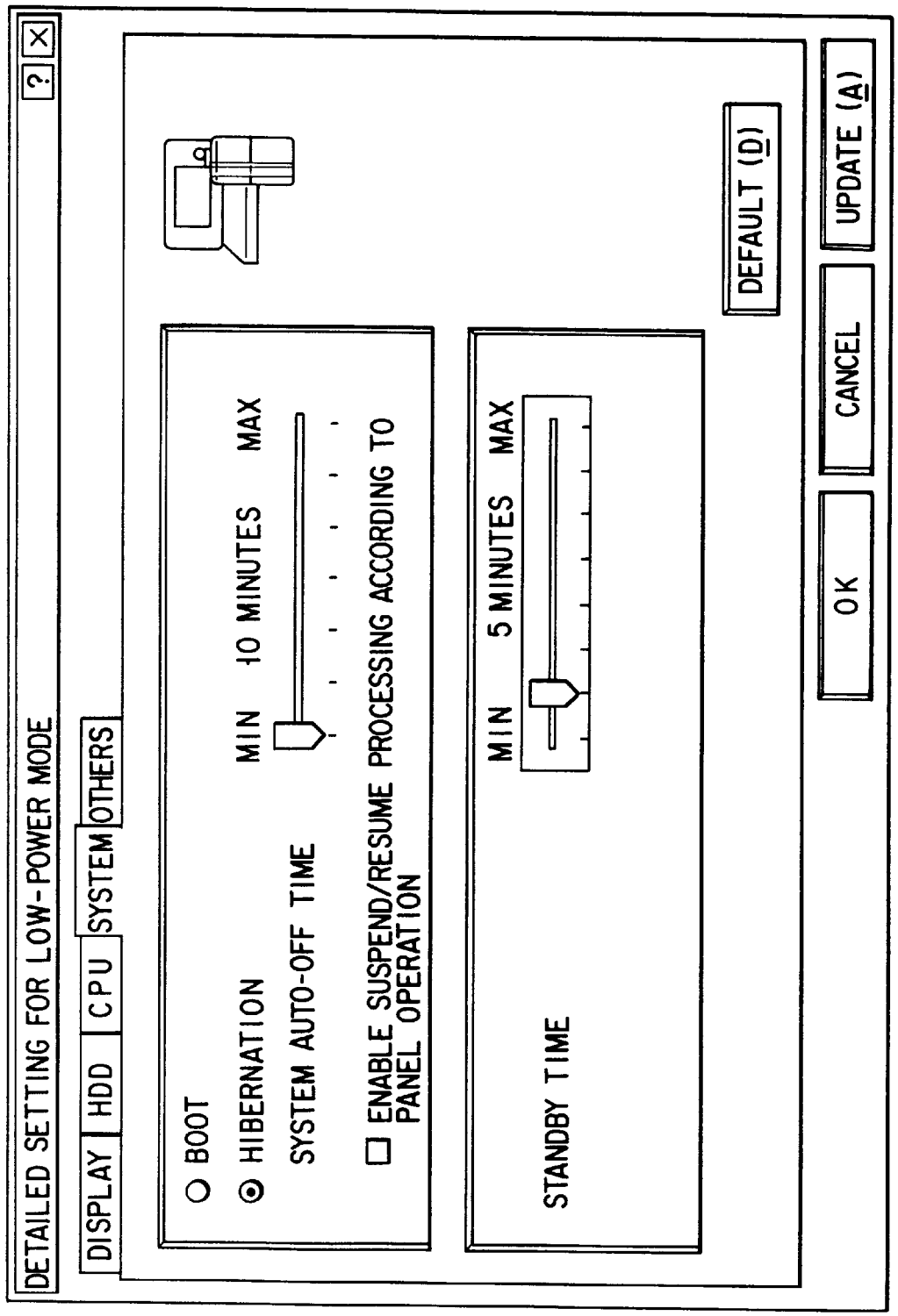

After selecting either the battery mode or the external power supply mode and one of the five power save modes, the user may clicks the "DETAILS" button included in the menu by operating the pointing device. The user can then set a more detailed power save mode, as will be explained with reference to FIGS. 7A and 7B. FIG. 7A shows the menu of setting a detailed power save mode for the full power mode. FIG. 7B shows the menu of setting a detailed power save mode for the low power mode.

As can be understood from FIGS. 7A and 7B, the user first select either boot or hibernation. If the hibernation is selected, the hibernation function will be validated. Then, the user can set a desirable computer system auto-off time by moving the slider bar shown in the menu. Then, the power supply to the computer system will be turned off when the system (the keyboard, pointing device, mouse, hard disk drive, communication module, etc.) remains unused for a time longer than the system auto-off time thus set. The system auto-off time can be invalidated if the full power mode is set as shown in FIG. 7A.

If the user selects the box of "ENABLE SUSPEND/RESUME PROCESSING ACCORDING TO PANEL OPERATION," which is displayed below the slider bar, the hibernation processing will be effected when the user closes the display panel.

Furthermore, the standby time can be set at a desired value by moving the other slider bar displayed in the menu. The standby time means the time which is required to completely turn of f the power supply to the computer system after data has been saved on the hard disk by means of the suspend processing. More precisely, the user may move this slider bar, thereby to set a desired standby time, ultimately in order to select and set the time-standby mode, the AC-standby mode or the permanent standby mode.

Assume that the power save mode menu of, for example, FIG. 6A is displayed and that the user has selected either the battery or the external power supply (AC adapter). Even in this case, the permanent standby mode will be selected if the user selects "FULL TIME" in the menu of (FIG. 7A) of setting details for the full power mode, and the AC-standby mode will be selected if the user selects "MAX" in the menu of FIG. 7A). The AC-standby mode thus selected becomes invalid and the time-standby mode is selected instead as will be described later, if the computer is not connected to the external power supply. The time-standby mode will be selected if the user selects "MIN" in the menu of FIG. 7A.

Figure 8:
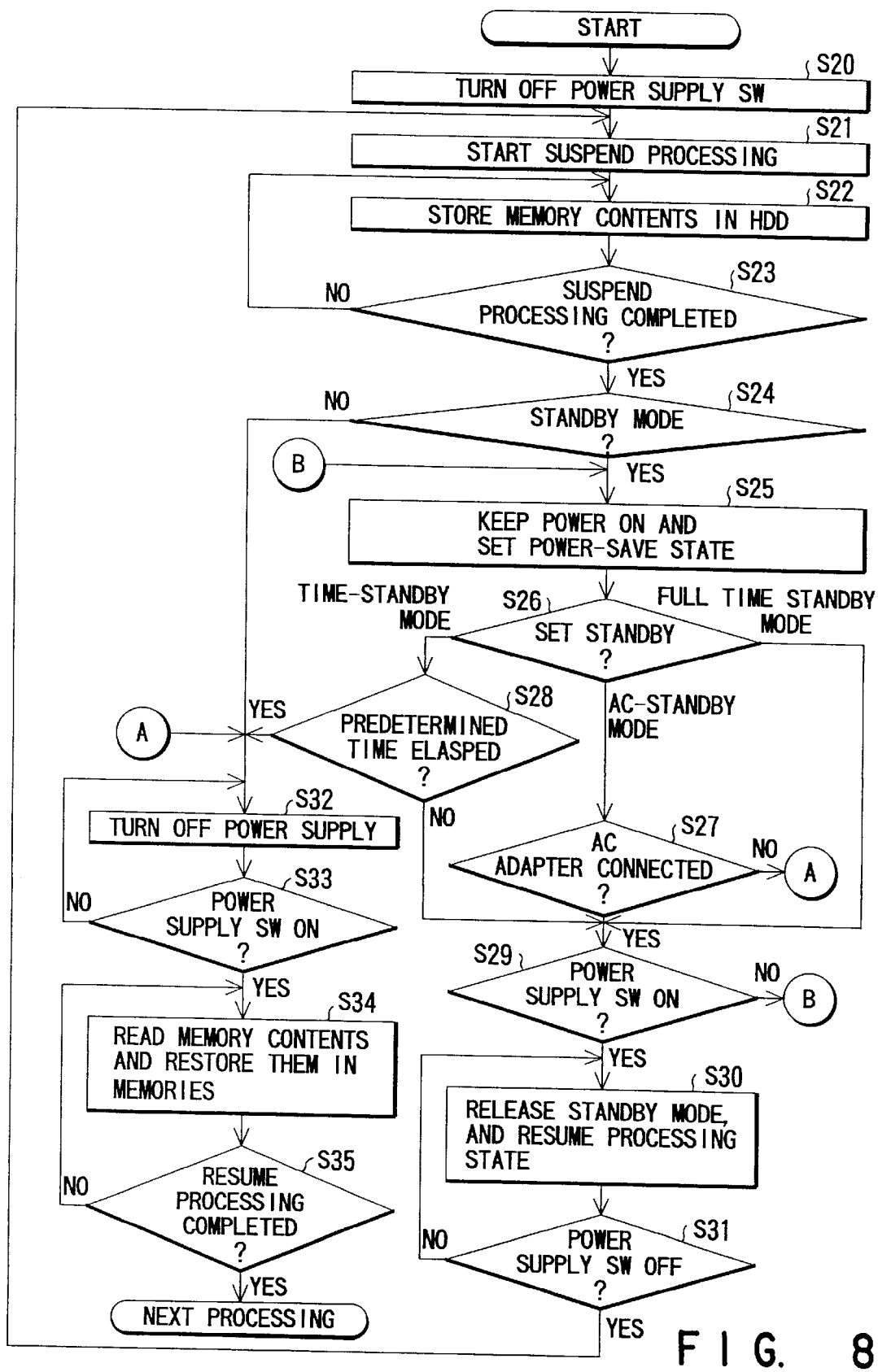
FIG. 8 is a flowchart for explaining how power-supply processing is effected in the computer after the suspend processing has been performed.

The operation of the hibernation type resume function including the standby modes in this embodiment will now be discussed referring to the flowcharts in FIG. 8.

It is premised that the power switch 9 has been set on and the power necessary for the system operation is supplied to the system from the battery 10 or the AC power supply 14 by the power supply controller 8, so that the system is operational. When detecting the supply of power from the AC power supply 14 based on the connection status of the AC power supply 14, the power supply controller 8 uses the power from the AC power supply 14 by priority.

When the user sets off the power switch 9 while power is given to the system, the BIOS 4 proceeds to a suspend process in response to an SMI sent from the power supply controller 8 (steps S20 and S21). That is, the contents of the internal register of the CPU 1 and other hardware registers are saved in the SM-RAM 2A of the backed-up main memory 2. In this embodiment, the current display contents are also saved in the SM-RAM 2A in order to accomplish a process of restoring the display screen. That is, a process of accessing the H area 5A of the HDD 5 and saving the entire memory contents (memory contents of the main memory 2 and the VRAM 7) in the H area 5A (steps S22 and S23). When a standby mode has been set, the backup power supply is kept on to maintain the memory contents of the main memory 2 and the SM-RAM 2A. Further, the system is set to a non-operational state (power save mode) (steps S24 and S25). In other words, the generation of the clock to the CPU 1 is disabled and the operations of the HDD 5 and the display unit 6 are kept disabled. In the standby mode, power is supplied only to the main memory 2 by the backup power supply and the entire memory contents are saved as mentioned earlier.

The BIOS determines which standby mode, the AC standby mode, the time standby mode or the permanent standby mode, is set (step S26). When nothing has been set by the user, the BIOS 4 sets the AC standby mode. As the AC standby mode does not function when no power is given from the AC power supply, however, the mode is switched to the time standby mode as discussed later (step S27).

As will be described later, each standby mode is released by a command indicating an power-on event from the power supply controller 8, i.e., by an interrupt sent from the SMI controller in accordance with the ON operation of the power switch 9. In the time standby mode, when the set time passes, this mode is released and the system is completely powered off (YES in step S28 and step 32).

The power supply controller 8 executes a power supply management (backup power supply control for the main memory 2 in this case) according to the information on the type of the standby mode sent from the BIOS 4. In the time standby mode, power supply from the battery 10 is carried out only for the set time. In the AC standby mode, power supply is carried out while AC power is supplied. The inhibition of the AC power supply is determined based on the connection status of the AC adapter. In the permanent standby mode, power is kept supplied regardless of the type of the power supply as long as power supply is maintained.

When the power switch 9 is set on on the above premise, the BIOS 4 releases the standby mode in accordance with a command from the power supply controller 8 and sets the system back to the operational condition (YES in step S29 and step S30). That is, the BIOS 4 restores the entire memory contents saved in the main memory 2 and sets the system back to the operational state before the occurrence of the power-off event. Specifically, register values from the display unit before the OFF action of the power switch 9 are restored from the SM-RAM 2A and displayed on the display screen of the display unit 6.

When the user switches the power switch 9 in the case where the standby mode has been released or in the case where the time standby mode was set and the system was powered off by passage of the set time, the BIOS 4 is activated to proceed to the resume process in response to an SMI sent from the power supply controller 8 (steps S32 to S35). Specifically, the BIOS 4 accesses the H area 5A of the HDD 5 to read the entire memory contents and restore them in the associated memories. As a result, the system returns to the operational state before the occurrence of the power-off event and resumes the operation.

According to this embodiment, as described above, the hibernation type resume function is provided with the AC standby mode, the time standby mode and the permanent standby mode as the standby control functions (standby modes). When the AC standby mode is set, power from the backup power supply is kept supplied to the main memory 2 while the supply of AC power as power for the system continues. When the power switch 9 is set on after the suspend process executed since the off event of the power switch 9, the memory contents can be restored quickly from the main memory 2 to set the system back to the operational state. When the power switch 9 is set on while the memory contents are saved on the HDD by the suspend process, the system can be set back to the operational state immediately. Therefore, the user can operate the computer without requiring a standby time.

When no AC power is used, the time standby mode which is the conventional standby mode is executed, so that power from the backup power supply is maintained only for a predetermined time. This can save limited power of the battery.

The permanent standby mode, if set, which is substantially the same as the AC standby mode when AC power is used, is effective when the battery power is used and the computer is used as a data communication device via a modem. In other words, it is necessary to always keep the computer in the standby mode in data communication and to set the system to an operational state quickly.

According to this invention, when AC power is used in the hibernation type resume function including the standby control functions, the standby control function which quickly restores the memory contents after power on in the resume mode can be accomplished. It is therefore possible to save the memory contents necessary for the system operation and immediately set the system back to the operational state by the power-on operation while the system is in the power save mode. This can improve the users' operability. When AC power and battery power are used as power for the system, the proper standby control function for the type of the power supply in use is used. This allows the resume function to be adapted widely.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

I claim:

1. A power supply control system for use in a computer having a volatile memory, comprising:

standby mode setting means for selectively setting one of plurality of standby modes including a first standby mode indicating that a backup power is to be supplied to the volatile memory while the computer receives AC power, and a second standby mode indicating that a backup power is to be supplied to the volatile memory for at least a predetermined time; and control means, responsive to a completion of a suspending process in the computer, for executing backup power supply control corresponding to a standby mode set by said standby mode setting means.

2. The system according to claim 1, further comprising means for selectively setting a hibernation function.

3. The system according to claim 1, wherein said control means executes backup power supply control corresponding to the first standby mode in the case where the standby mode is not designated.

4. The system according to claim 1, wherein said control means executes backup power supply control corresponding to the second standby mode when the computer does not receive AC power even if the first standby mode is set.

5. The system according to claim 1, further comprising means for determining whether or not the computer is receiving AC power, based on whether or not an AC adapter is connected to the computer.

6. A power supply control system for use in a computer having a volatile memory, comprising:

standby mode setting means for selectively setting one of a plurality of standby modes including a first standby mode indicating that backup power is to be supplied to the volatile memory while the computer receives AC power, a second standby mode indicating that backup power is to be supplied to the volatile memory for a predetermined time, and a third standby mode indicating that backup power is to be kept supplied to the volatile memory; and control means, responsive to a completion of a suspending process in the computer, for executing backup power supply control corresponding to a standby mode set by said standby mode setting means.

7. The system according to claim 6, further comprising means for selectively setting a hibernation function.

8. The system according to claim 6, wherein said control means executes backup power supply control corresponding to the first standby mode in the case where no standby mode is set.

9. The system according to claim 6, wherein said control means executes backup power supply control corresponding to the second standby mode when the computer does not receive AC power even if the first standby mode is set.

10. The system according to claim 6, further comprising means for determining whether or not the computer is receiving AC power, based on whether or not an AC adapter is connected to the computer.

11. A power supply control method for use in a computer having a volatile memory, comprising the steps of:

selectively setting one of plurality of standby modes including a first standby mode indicating that backup power is to be supplied to the volatile memory while the computer receives AC power, and a second standby mode indicating that backup power is to be supplied to the volatile memory for at least a predetermined time; and executing, responsive to a completion of suspending process in the computer, backup power control corresponding to a standby mode set in said standby mode setting step.

12. The method according to claim 11, further comprising the step of selectively setting a hibernation function.

13. The method according to claim 11, wherein said control step includes the step of executing backup power supply control corresponding to the first standby mode in the case where no standby mode is set.

14. The method according to claim 11, wherein said control means includes the step of executing backup power supply control corresponding to the second standby mode when the computer does not receive AC power even if the first standby mode is set.

15. The method according to claim 11, further comprising the step of determining whether or not the computer is receiving AC power, based on whether or not an AC adapter is connected to the computer.

16. A power supply control method for use in a computer having a volatile memory, comprising the steps of:

selectively setting one of plurality of standby modes including a first standby mode indicating that backup power is to be supplied to the volatile memory while the computer receives AC power, a second standby mode indicating that backup power is to be supplied to the volatile memory for a predetermined time, and a third standby mode indicating that backup power is to be kept supplied to the volatile memory; and executing, responsive to a completion of suspending process in the computer, backup power supply control corresponding to a standby mode set in said standby mode setting step.

17. The method according to claim 16, further comprising the step of selectively setting a hibernation function.

18. The method according to claim 16, wherein said control step includes the step of executing backup power supply control corresponding to the first standby mode in the case where no standby mode is set.

19. The method according to claim 16, wherein said control means includes the step of executing backup power supply control corresponding to the second standby mode when the computer does not receive AC power even if the first standby mode is set.

20. The method according to claim 16, further comprising the step of determining whether or not the computer is receiving AC power, based on whether or not an AC adapter is connected to the computer.

* * * * *